United States Patent

Takano et al.

[11] Patent Number: 5,088,703
[45] Date of Patent: Feb. 18, 1992

[54] VIBRATION ISOLATING APPARATUS

[75] Inventors: Kazuya Takano, Kamakura; Hiroshi Kojima, Yokohama, both of Japan

[73] Assignee: Bridgestone Corporation, Tokyo, Japan

[21] Appl. No.: 627,577

[22] Filed: Dec. 14, 1990

[30] Foreign Application Priority Data

Dec. 26, 1989 [JP] Japan ................................. 1-336959

[51] Int. Cl.⁵ .................................................. F16F 5/00
[52] U.S. Cl. .............................. 267/140.1 C; 267/219;
267/140.1 E
[58] Field of Search ............... 267/140.1 R, 140.1 C, 267/153, 219; 180/300, 312, 902; 248/562, 636

[56] References Cited

U.S. PATENT DOCUMENTS

| | | | |
|---|---|---|---|
| 4,693,456 | 9/1987 | Kanda | 267/140.1 C |
| 4,728,086 | 3/1988 | Irhiyama et al. | 267/140.1 C |
| 4,865,299 | 9/1989 | Goto | 267/140.1 C |
| 4,909,489 | 3/1990 | Doi | 267/140.1 C |
| 4,971,299 | 11/1990 | Doi | 262/140.1 C |

FOREIGN PATENT DOCUMENTS 63-176844 7/1988 Japan .

Primary Examiner—Joseph F. Peters, Jr.
Assistant Examiner—Virna Lissi Mojica
Attorney, Agent, or Firm—Oliff & Berridge

[57] ABSTRACT

A vibration isolating apparatus includes an inner cylinder supported by one of a vibration producing portion and a vibration receiving portion; an outer cylinder supported by the other and disposed around an outer periphery of the inner cylinder in such a manner as to surround the inner cylinder; a liquid chamber provided between the inner cylinder and the outer cylinder and partitioned into a main liquid chamber and an auxiliary liquid chamber; an orifice passage for allowing the main liquid chamber and the auxiliary liquid chamber to communicate with each other; an electrorheological fluid filled in the liquid chamber; and a pair of electrode plates provided in the orifice passage and adapted to apply an electric field to the electrorheological fluid so as to change the viscosity of the electrorheological fluid. Hence, the electric field applied to the electrorheological fluid undergoes a change as the amount of electric current supplied to the electrode plates is changed, thereby changing the viscosity of the electrorheological fluid in the orifice passage.

8 Claims, 4 Drawing Sheets

VIBRATION ISOLATING APPARATUS

BACKGROUND OF THE INVENTION

1. Field of the Invention

The present invention relates to a vibration isolating apparatus in which a plurality of small liquid chambers are disposed between a vibration generating portion and a vibration receiving portion so as to absorb vibrations by means of flow resistance of a liquid moving between the small liquid chambers.

2. Description of the Related Art

A known vibration isolating apparatus for an engine mount, a carburetor mount, a body mount and so forth for use in automobiles is provided with a liquid chamber a part of which is formed of a resilient member. This liquid chamber is partitioned into a plurality of small liquid chambers by partition walls, and the small liquid chambers communicate with each other through restraining passages. For this reason, vibrations are absorbed by resistance occurring when the liquid in one small liquid chamber passes through the restraining passage and moves to another small liquid chamber at the time of occurrence of the vibrations.

With the conventional vibration isolating apparatus, however, since the size of an orifice is uniform, it is possible to absorb vibrations in correspondence with a desired frequency, but it is impossible to cope with vibrations having different frequencies.

For instance, in order to isolate vibrations during engine shaking, if an attempt is made to attenuate the vibrations at frequencies occurring at that time, the orifice becomes clogged during idling when vibrations of higher frequencies are produced, resulting in an increase in the dynamic spring constant. Hence, there is the drawback that the vibration isolating effect declines appreciably during idling.

SUMMARY OF THE INVENTION

Accordingly, an object of the present invention is to provide a vibration isolating apparatus which is capable of obtaining an effective attenuating effect in a wide range of frequencies, thereby overcoming the above-described drawback of the conventional art.

To this end, in accordance with the present invention, there is provided a vibration isolating apparatus comprising: a first cylindrical member supported by one of a vibration producing portion and a vibration receiving portion; a second cylindrical member supported by the other of the vibration producing portion and the vibration receiving portion; a liquid chamber provided between the first cylindrical member and the second cylindrical member and partitioned into a main liquid chamber and an auxiliary liquid chamber; a resilient diaphragm serving as a partition wall of the auxiliary liquid chamber and adapted to expand or shrink the auxiliary liquid chamber; an orifice member interposed between the first cylindrical member and the second cylindrical member, the orifice member having therein an orifice constituted by a passage which has a rectangular cross section with its long side portion formed to be not less than two times a short side portion thereof, the orifice allowing the main liquid chamber and the auxiliary liquid chamber to communicate with each other; a pair of electrode plates provided in opposing long side portions of the passage, respectively; and an electrorheological fluid which is filled in the liquid chamber and whose viscosity changes with the magnitude of an electric field applied thereto.

In the present invention having the above-described arrangement, vibrations are absorbed by resistance occurring when the electrorheological fluid passes through the aforementioned passage, in the same way as a generally employed vibration isolating apparatus in cases where the electrode plates are not energized. In addition, if a different electric field is produced by the electrode plates, the viscosity of the electrorheological fluid changes in correspondence with that electric field, so that the passage resistance at the orifice changes. Hence, it is possible to cope with vibrations having different frequencies.

As described above, with the vibration isolating apparatus in accordance with the present invention, the cross-sectional long sides of the passage constituting the orifice are set to be not less than two times the cross-sectional short sides of the passage, and the electrode plates are provided in the passage. Hence, it is possible to obtain the advantage that vibrations can be attenuated in a wider range of frequencies.

The above and other objects, features and advantages of the invention will become more apparent from the following detailed description of the invention when read in conjunction with the accompanying drawings.

BRIEF DESCRIPTION OF THE DRAWINGS

FIGS. 1 to 4 illustrate an embodiment of a vibration isolating apparatus in accordance with the present invention, in which, FIG. 1 is a cross-sectional view taken along the line 1 1 of FIG. 2;

FIG. 2 is a cross-sectional view taken along the line 2 2 of FIG. 1;

FIG. 3 is a side elevational view; and

FIG. 4 is an exploded perspective view of an inner cylinder, an intermediate cylinder, an outer cylinder, and orifice unit pieces.

DESCRIPTION OF THE PREFERRED EMBODIMENTS

FIGS. 1 to 4 illustrate an embodiment of a vibration isolating apparatus 10 in accordance with the present invention.

Figure 1:
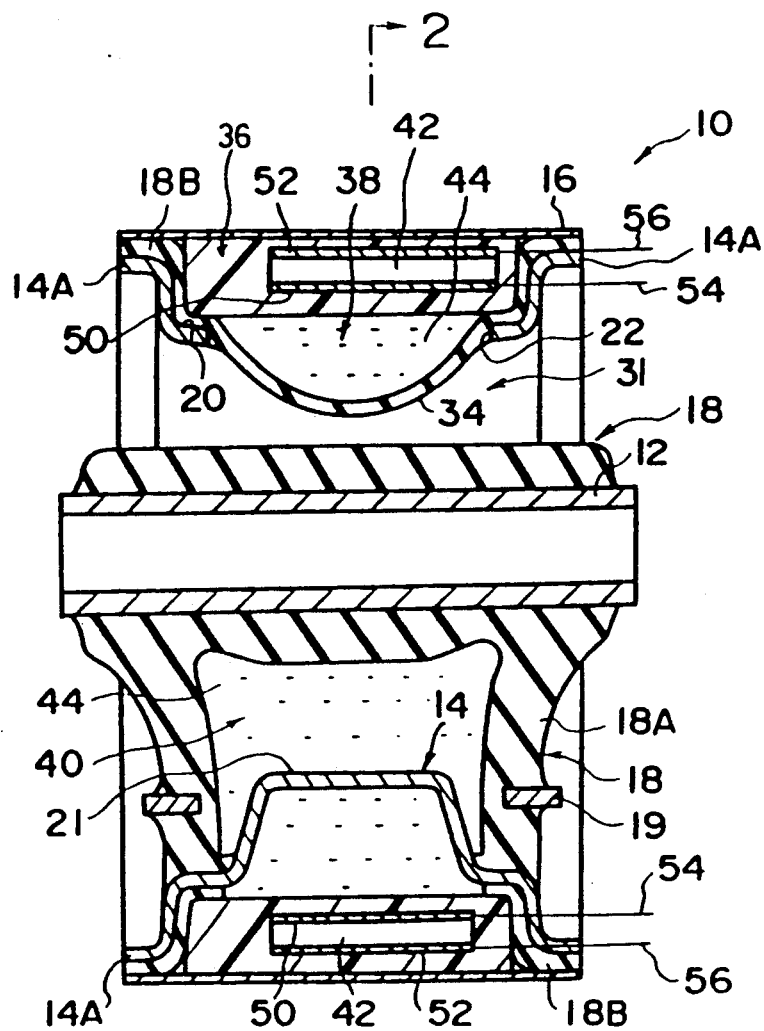

As shown in FIG. 1, an inner cylinder 12 serving as a first cylindrical member is provided in an axial portion of the vibration isolating apparatus 10, and an intermediate cylinder 14 serving as a third cylindrical member and an outer cylinder 16 serving as a second cylindrical member are disposed around the inner cylinder 12 in parallel with the axial direction of the inner cylinder 12. In this embodiment, the inner cylinder 12 is mounted on an unillustrated automobile engine, while the outer cylinder 16 is mounted on the chassis of the automobile. Main body rubber 18 serving as a resilient member is disposed between an outer peripheral surface of the inner cylinder 12 and an inner peripheral surface of the outer cylinder 16. The main body rubber 18 is vulcanized to the inner cylinder 12, the intermediate cylinder 14, and the outer cylinder 16. A semi-circular arc-shaped inter ring 19 is embedded in a pair of legs 18A of the main body rubber 18.

The intermediate cylinder 14 has its axially opposite ends (left- and right-hand portions in FIG. 1) formed as large-diameter portions 14A, and its axially intermediate portion formed as a small-diameter portion 20, the large diameter portions 14A being disposed on the inner side of outer cylinder 16 at axially opposite ends thereof via the main body rubber 18. In addition, the axially opposite end faces of the intermediate cylinder 14 are flush with the end faces of the outer cylinder 16.

An auxiliary liquid chamber 38 and a main liquid chamber 40 are respectively formed inside the main body rubber 18 with the inner cylinder 12 placed therebetween, and an electrorheological fluid 44 is filled in the auxiliary liquid chamber 38 and the main liquid chamber 40. Isododecane may be used as an example of this electrorheological fluid 44.

A cavity portion 31 is penetratingly formed between the auxiliary liquid chamber 38 and the inner cylinder 12 along the axial direction of the inner cylinder 12, and thin-walled diaphragm rubber 34 serving as a partition wall for the auxiliary liquid chamber 38 is disposed between the cavity portion 31 and the auxiliary liquid chamber 38. The auxiliary liquid chamber 38 is expandable and shrinkable by virtue of the resilient deformation of the diaphragm rubber 34. This diaphragm rubber 34 extends through a notch 22 formed in the small-diameter portion 20 of the intermediate cylinder 14 and protrudes toward the inner cylinder 12, as shown in FIG. 1.

In addition, a stopper portion 21 is formed in a portion of the small-diameter portion 20 (on the lower side in FIG. 1) opposed to the notch 22 provided in the small diameter portion 20 of the intermediate cylinder 14, the stopper portion 21 being provided in such a manner as to extend in the main liquid chamber 40. This stopper portion 21 functions to restrict the movement of the inner cylinder 12 when a large load acts on the inner cylinder 12, thereby buckling the legs 18A of the main body rubber 18. A plurality of notches 21A are formed in the stopper portion 21, so that the flow of the electrorheological fluid 44 in the main liquid chamber 40 will not be restricted by the stopper portion 21.

Figure 4:
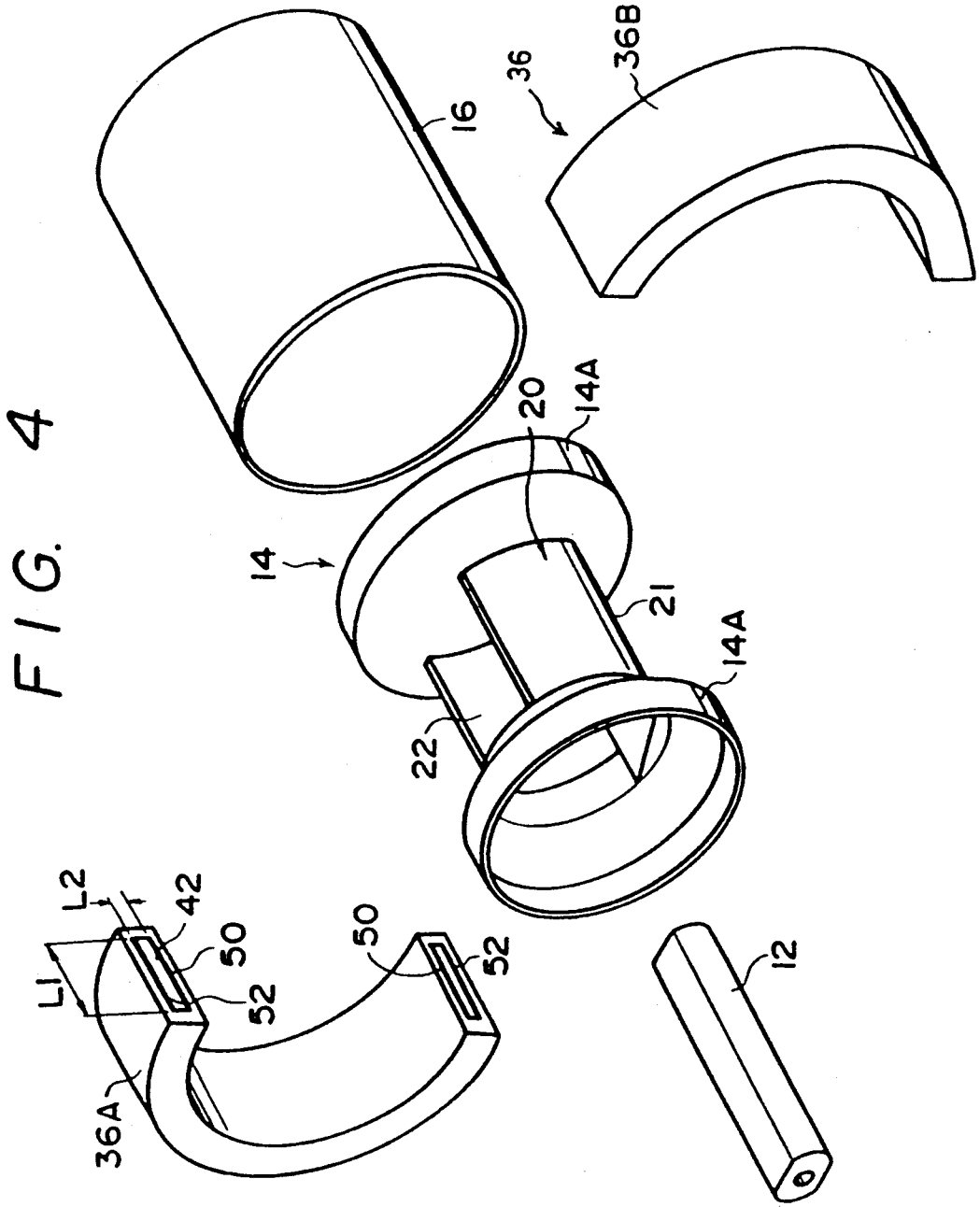

A pair of orifice unit pieces 36A, 36B for forming an orifice member 36 shown in FIG. 4 are disposed around an outer periphery of the small-diameter portion 20. Formed in this orifice member 36 is an orifice 42 allowing the auxiliary fluid chamber 38 and the main liquid chamber 40 to communicate with each other. Both of these orifice unit pieces 36A, 36B are substantially semicircular in configuration, and are formed in such a manner as to become annular as their opposite ends are brought into contact with each other. As shown in FIG. 4, the orifice 42 is longitudinal in cross section, and the length. L1 of its long side is formed to be approximately five times the length L2 of its short side (L1 is preferably not less than two times L2, more preferably L1 is not less than three times L2).

A pair of electrode plates 50, 52 are disposed in face-to-face relationship with the long sides of the orifice 42, respectively. In this embodiment, the electrode plate 50 is set to be a minus pole, while the electrode plate 52 is set to be a plus pole. These electrode plates 50, 52 are connected to a control circuit and a power source (neither are shown) via lead wires 54, 56, respectively.

Figure 2:
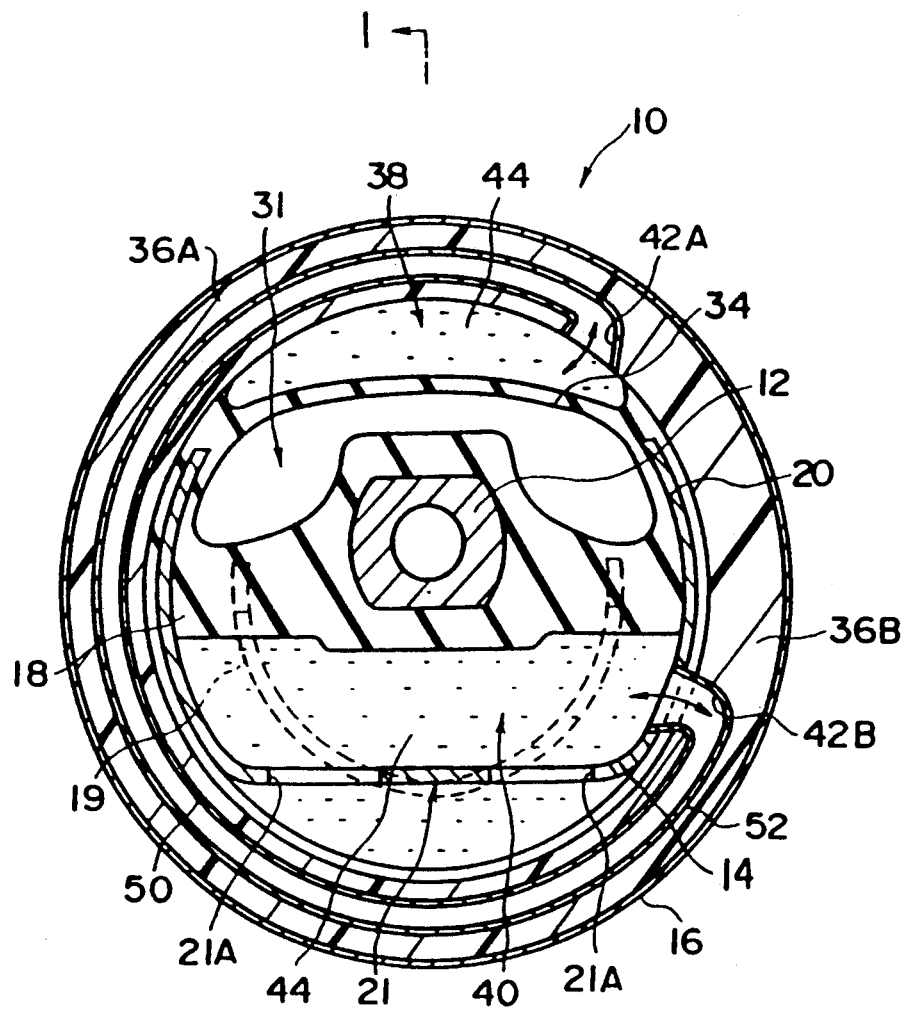
Figure 3:
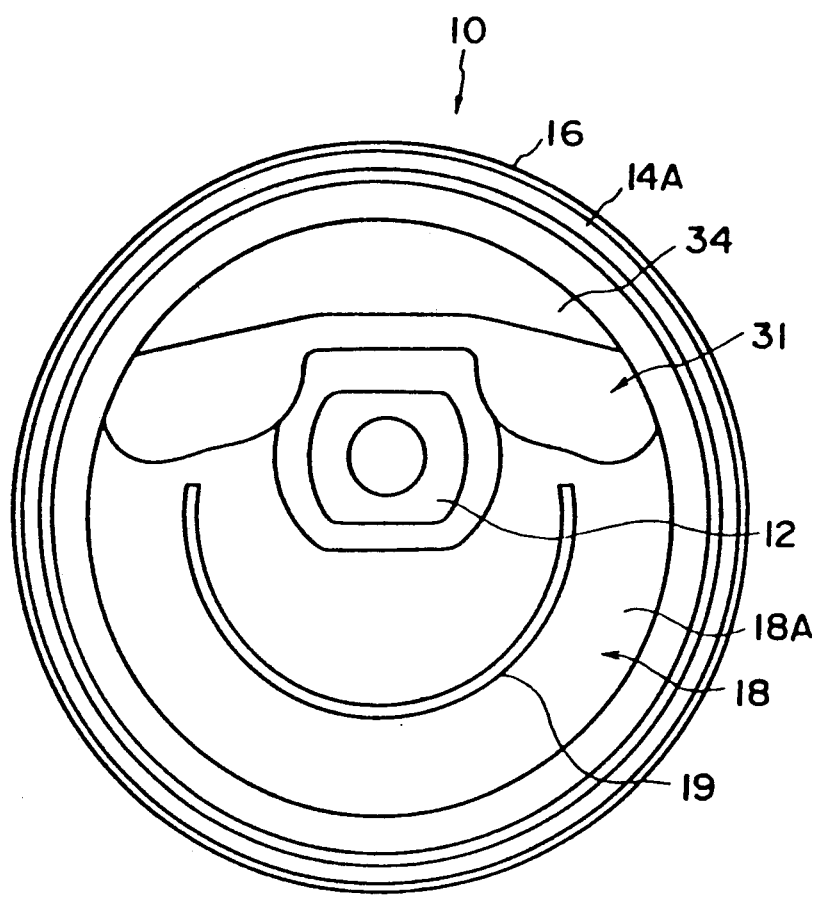

As shown in FIG. 2, openings 42A, 42B are respectively formed in the orifice unit piece 36B. The opening 42A corresponds to the auxiliary liquid chamber 38, and the opening 42B to the main liquid chamber 40, so that the orifice 42 allows the auxiliary liquid chamber 38 and the main liquid chamber 40 to communicate with each other.

The orifice unit pieces 36A, 36B are made to closely adhere to a thin-walled portion 18B of the main body rubber 18 extending to the outer periphery of the intermediate cylinder 14, and this thin-walled portion 18B hermetically seals a gap between the outer cylinder 16 and the large-diameter portion 14A of the intermediate cylinder 14. In addition, the inner peripheral surfaces of the orifice unit pieces 36A, 36B constitute wall surfaces of the auxiliary liquid chamber 38 and the main liquid chamber 40.

The operation of this embodiment will be described hereinunder.

With the vibration isolating apparatus 10 constructed as described above, by mounting the inner cylinder 12 on an unillustrated engine and the outer cylinder 16 on an unillustrated chassis of the vehicle, vibrations are transmitted to the main body rubber 18 via the inner cylinder 12. The main body rubber 18 absorbs the vibrations through internal friction.

In addition, the electrorheological fluid 44 inside the auxiliary liquid chamber 38 and the main liquid chamber 40 passes through the orifice 42 by means of the vibrations, and the vibrations are absorbed also by resistance occurring at the time of passage thereof. Moreover, since the orifice 42 of this invention is formed with a large cross section, it is possible to obtain a high level of attenuation.

As the electrode plates 50, 52 are energized via the lead wires 54, 56, the viscosity of the electrorheological fluid 44 inside the orifice 42 gradually increases with an increase in the electric field corresponding to the amount of energization thereof, and the resonance frequency of the electrorheological fluid 44 gradually fluctuates toward the low-frequency side. For this reason, it is possible to vary the viscosity of the electrorheological fluid 44 ranging from the state in which the electrode plates 50, 52 are not provided to the state in which the electrorheological fluid 44 inside the orifice 42 is completely solidified (resulting in an increase in the dynamic spring constant) and the orifice 42 is closed as a result. Hence, it is possible to absorb the vibrations over a wide range of frequencies by adjusting the flow resistance.

For example, by adjusting the vibration isolating apparatus 10 by estimating in advance the frequencies of vibrations occurring at the time of idling with high-frequency vibrations, the electrode plates 50, 52 are energized during engine shaking with low-frequency vibrations, so that a high level of attenuation will be obtained during engine shaking.

As a result, it is possible to constantly improve the riding comfort and steering stability of the vehicle by changing the spring constant.

What is claimed is:

1. A vibration isolating apparatus comprising:
   a first cylindrical member supported by one of a vibration producing portion and a vibration receiving portion;
   a second cylindrical member supported by the other of said vibration producing portion and said vibration receiving portion;
   said first cylindrical member disposed inside said second cylindrical member in such a manner that its axis is substantially parallel with an axis of said second cylindrical member;
   a liquid chamber provided between said first cylindrical member and said cylindrical member and partitioned into a main liquid chamber and an auxiliary liquid chamber;

a resilient diaphragm serving as a partition wall of said auxiliary liquid chamber and adapted to expand or shrink said auxiliary liquid chamber;

an orifice member interposed between said first cylindrical member and said second cylindrical member, said orifice member having therein an orifice constituted by a passage which has a rectangular cross section with its long side portion formed to be not less than two times a short side portion thereof, said orifice allowing said main liquid chamber and said auxiliary liquid chamber to communicate with each other;

said orifice member comprising a two-piece annular member disposed on the inner side of said second cylindrical member, each of said two pieces being semi-circular arc-shaped, and entirely defining said passage;

a pair of electrode plates provided in opposing long side portions of said passage, respectively; and an electrorheological fluid which is filled in said liquid chamber and whose viscosity changes with the magnitude of an electric field applied thereto.

2. A vibration isolating apparatus according to claim 1, wherein said vibration isolating apparatus attenuates high-frequency vibrations of the vibration source without energization of the electrode plates, and attenuates low-frequency vibrations of the vibration source with a high level by energization of the electrode plates.

3. A vibration isolating apparatus according to claim 1, wherein a third cylindrical member having an axis parallel with said axes of said first cylindrical member and said second cylindrical member is disposed between said first cylindrical member and said second cylindrical member.

4. A vibration isolating apparatus according to claim 1, wherein said orifice extends in a direction parallel with an inner periphery of said second cylindrical member.

5. A vibration isolating apparatus according to claim 1, wherein the length of said long side portion is set to be not less than three times the length of said short side portion.

6. A vibration isolating apparatus according to claim 1, wherein said orifice is provided in such a manner that said long side portions extend in a direction substantially parallel with said axis of said second cylindrical member.

7. A vibration isolating apparatus comprising:

an inner cylinder supported by one of a vibration producing portion and a vibration receiving portion;

an outer cylinder supported by the other of said vibration producing portion and said vibration receiving portion and disposed around an outer periphery of said inner cylinder in such a manner as to be provided with an axis oriented in a direction substantially parallel with an axis of said inner cylinder;

a liquid chamber provided between said inner cylinder and said outer cylinder and partitioned into a main liquid chamber and an auxiliary liquid chamber;

a resilient member for connecting said inner cylinder and said outer cylinder relatively movably with respect to each other and adapted to permit said liquid chamber to expand or shrink;

a diaphragm rubber constituting a part of a partition wall of said auxiliary liquid chamber and adapted to permit said auxiliary liquid chamber to expand or shrink;

an orifice member interposed between said inner cylinder and said outer cylinder and having therein an orifice constituted by a passage, said orifice allowing said main liquid chamber and said auxiliary liquid chamber to communicate with each other;

said orifice member comprising a two-piece annular member disposed on the inner side of said outer cylinder, each of said two pieces being semi-circular arc-shaped, and entirely defining said passage;

an electrorheological fluid which is filled in said liquid chamber and whose viscosity changes with the magnitude of an electric field applied thereto; and a pair of electrode plates provided in opposing side portions of said passage, respectively, and adapted to apply an electric field to said electrorheological fluid.

8. A vibration isolating apparatus according to claim 7, wherein said vibration isolating apparatus attenuates high-frequency vibrations of the vibration source without energization of the electrode plates, and attenuates low-frequency vibrations of the vibration source with a high level by energization of the electrode plates.

* * * * *